United States Patent Office 2,935,465
Patented May 3, 1960

2,935,465
CATALYTIC CONVERSION OF HYDROCARBONS

Charles J. Plank, Woodbury, N.J., assignor to Socony Mobil Oil Company, Inc., a corporation of New York No Drawing. Application May 24, 1957
Serial No. 661,305

6 Claims. (Cl. 208—141)

This invention relates to a process for catalytically converting mixtures of hydrocarbons. More specifically, the present invention is directed to a combination cracking and reforming process in which a mixed feed of gas oil and naphtha is passed over a catalyst consisting essentially of a mixture of silica-magnesia gel and activated charcoal under conditions of low pressure and high temperature with resultant increase in the octane number together with simultaneous improvement in the yield of the gasoline fraction.

In one specific embodiment, the present invention comprises the treatment of mixtures of gas oils and naphthas by contacting said mixtures with a catalytic composite of silica-magnesia gel and activated charcoal at temperatures within the approximate range of 1000° F.–1200° F. at pressures between about atmospheric and about 100 pounds per square inch for every short contact time not exceeding about one second.

It has been discovered that when mixtures of gas oils and naphtha fractions are contacted under the aforementioned conditions with a catalytic composite of silica-magnesia gel and activated carbon, concurrent cracking and reforming occurs, resulting in an improved yield of high octane number gasoline. Without being limited by any theory, it would appear that when mixtures of naphtha and gas oil are charged simultaneously over a catalytic composite of silica-magnesia gel and activated charcoal, a complex type of hydrogen transfer occurs, particularly at the high temperatures employed. The result is a greater yield of gasoline with a higher octane number than that obtained by separate processing of the gas oil or naphtha. In addition, an unexpected synergistic action appears to occur between the catalyst components of silica-magnesia gel and activated charcoal, giving rise to a greater yield of higher octane number gasoline than obtained under comparable reaction conditions with a catalyst of either silica-magnesia gel or activated charcoal alone.

The process accordingly necessitates the use of a catalytic composite of silica-magnesia gel and activated charcoal. The silica-magnesia gel component is of the type heretofore used as a cracking catalyst, comprising approximately 15 to 45 percent by weight of magnesia and remainder, silica. Such silica-magnesia gels may be prepared by known methods and accordingly details of their preparation need not be repeated here. The activity index of such silica-magnesia component, as determined by the CAT-A method, is generally within the range of 30 to 50. The CAT-A test is a method used for commercially testing and evaluating cracking catalysts, the activity of a catalyst being numerically equal to the volume percent of gasoline formed when a standardized gas oil charge stock is passed over the catalyst at standard cracking conditions. The details of such test have been described in National Petroleum News, page R-537, August 2, 1944. The silica-magnesia gel component is intimately combined with the activated charcoal component in a weight ratio of between about 1:2 and 2:1.

A catalytic composite make-up of substantially equal weight proportions of silica-magnesia gel and activated charcoal has been found to give excellent results. It is generally preferred to prepare the catalytic composite by separately milling the silica-magnesia and the activated charcoal components, followed by intimately mixing these two materials and then milling this mixture to achieve a high degree of intermixing of the two components. The resulting mixture is then subjected to particle formation, for example by pelleting or extrusion if relatively large particles are to be used, or to rewetting and drying if a finely divided composite suitable for use in a fluid type process is desired. Other feasible methods for preparing the catalytic composite involve initial intimate admixture of dried or calcined silica-magnesia gel with activated charcoal by milling the same together to fine powders and treating as above or alternatively by interspersing very finely ground activated charcoal in silica-magnesia hydrogel, followed by drying and tempering the resultant composite in a non-oxidizing atmosphere. In the latter instance, the hydrogel-charcoal mixture may, if desired, be extruded directly or the dried product may be formed into particles by suitable means, such as pelleting.

The charge stock used in the present process is a mixture of a gas oil, i.e., a petroleum fraction boiling within the gas oil range and generally between about 400° F. and about 950° F. and a petroleum naphtha, i.e., a petroleum fraction having a boiling point within the naphtha range and generally between about 200° F. and about 400° F. The volume ratio of gas oil to naphtha in the charge stock is generally between 10:1 and 1:1 and preferably between 5:1 and 1.5:1.

The contact time between the charge stock and the catalyst as indicated hereinabove is extremely short, being less than about one second and preferably less than about 0.3 second. The temperature employed is within the approximate range of 1000° F. to 1200° F. The pressure is within the approximate range of atmospheric to 100 pounds per square inch.

In order to obtain the above-indicated high temperature, it is generally desirable to dilute the charge stock with steam to the extent of approximately 10 to 50 percent by weight. Other means of introducing heat into the reaction may also be used, such as by employing induction heating or by employing a heated catalyst or by using heated inert materials in admixture with the catalyst charge. It is generally preferred, however, to employ steam as the heat producing media and in such regard the above-described catalytic composite of silica-magnesia gel and activated charcoal is particularly adapted since it is steam stable.

The ratio of catalyst to charge stock will generally be between 0.1 and 20. As indicated hereinabove, it is necessary that the contact time between the catalyst and charge stock be extremely short since it has been observed that the octane improvement in the gasoline fraction decreases with increasing contact time. It is accordingly desirable to maintain the contact time between the catalyst and charge stock at less than about one second and preferably less than 0.3 second.

Several experiments were carried out at 1100° F., with a mixture of a gas oil having a boiling range of 450° F. to 950° F. and a gravity of 29.7° A.P.I. and a naphtha having a boiling range of 230° F. to 395° F. and a gravity of 55.2 A.P.I. The composition of the charge stock was 37 volume percent naphtha and 63 volume percent gas oil. Runs were carried out utilizing various catalysts, including: (1) silica-magnesia gel consisting of 33 percent MgO and 67 percent SiO$_2$, having a surface area of 400 square meters per gram and an activity index (CAT-A) of 44.4, (2) activated charcoal characterized by a surface area of about 1100 square meters per gram, and (3) a catalytic composite consisting of equal parts by weight of the above silica-magnesia gel and activated charcoal which had been prepared by ball-milling together for 16 hours, 200 grams of activated charcoal, 246 grams of silica-magnesia gel containing 19 percent by weight volatile matter at 1000° F., thus giving 200 grams of silica-magnesia gel on a calcined basis, and 1000 cc. of distilled water. The resulting product was dried at 280° F. for 72 hours, reground, and then ball-milled again for 16 hours using 200 cc. of water for each 100 grams of powder. The product was then redried at 280° F. for 20 hours and then reground to size suitable for pelleting. This material was then pelleted and the resulting pellets tempered for 4 hours in nitrogen at 950° F. All runs were carried out at a catalyst to charge ratio of 0.1, employing a liquid hourly space velocity at 17.1–17.8, a residence time of about 0.1 second and a 30–35 percent by weight steam dilution. The results of this investigation are summarized in the table below:

Table I

| Charge | Mixture of Gas Oil and Naphtha | | |
|---|---|---|---|
| Catalyst | Silica-Magnesia | Activated Charcoal | Composite of Silica-Magnesia and Activated Charcoal |
| Conversion, Percent Vol | 63.2 | 66.2 | 83.0 |
| Products Distribution: | | | |
| Dry Gas, Percent Wt. of Charge | 5.2 | 8.6 | 8.9 |
| Coke, Percent Wt | 0.6 | 2.7 | 1.6 |
| Total C₄'s, Percent Vol | 3.0 | 3.4 | 5.9 |
| Total C₅'s, Percent Vol | 0.8 | 1.1 | 1.9 |
| (C₆+) Gasoline, Percent Vol | 58.7 | 54.8 | 68.6 |
| Products Properties Gasoline (C₆+): | | | |
| O.N. Research, Clear | 73.5 | 68.5 | 74.2 |
| O.N. Research, +3 cc. TEL | | 82.6 | 87.4 |
| Yields: | | | |
| Dry Gas, Percent Wt. of Charge | 5.2 | 8.6 | 8.9 |
| Coke, Percent Wt | 0.6 | 2.7 | 1.6 |
| Excess C₄'s, Percent Vol | −1.4 | −0.7 | 0.2 |
| 10—RVP Gasoline, Percent Vol | 63.9 | 60.0 | 76.2 |
| O.N. Research, Clear | 76.5 | 72.5 | 77.8 |
| O.N. Research, +3 cc. TEL | | 84.8 | 89.4 |

It is to be noted from the above table that the catalytic composite of silica-magnesia and activated charcoal had a much greater activity than either alone. The data show that activated charcoal is quite effective in promoting hydrogen transfer utilizing the mixed charge of gas oil and naphtha as indicated by a sharp increase in conversion, as well as improvement in gasoline yield. It will further be seen that the research octane rating, clear, of gasoline both as obtained and 10 R.V.P. is higher with the catalytic composite of silica-magnesia and activated charcoal than with either alone.

Another series of runs was carried out showing the effect of temperature and on-stream time on the hydrogen transfer between naphtha and gas oil over the above-described catalytic composite of silica-magnesia gel and activated charcoal using a charge of 37 volume percent of naphtha and 63 volume percent of gas oil having the boiling range and gravity characteristics described above. The results, together with comparative data for the behavior of component catalysts, are given in Table II below:

Table II

| Catalyst | Silica-Magnesia | | Activated Charcoal | | Composite of Silica-Magnesia and Activated Charcoal | | |
|---|---|---|---|---|---|---|---|
| Run Designation | A | B | C | D | E | F | G |
| Temperature, °F | 950 | 1,100 | 950 | 1,100 | 950 | 1,100 | 1,100 |
| Liquid Hourly Space Velocity | 1.5 | 17.0 | 1.5 | 17.1 | 1.5 | 17.1 | 17.1 |
| Residence Time, Second | 1.8 | 0.1 | 1.8 | 0.1 | 1.8 | 0.1 | 0.1 |
| Catalyst/Charge Ratio | 2.0 | 2.1 | 2.0 | 0.1 | 2.0 | 0.4 | 0.1 |
| Steam, Percent Wt | 15 | 31 | 15 | 31 | 15 | 31 | 31 |
| Conversion, Percent Vol | 81.6 | 75.8 | 87.6 | 66.2 | 89.8 | 88.5 | 83.0 |
| Products Distribution: | | | | | | | |
| Dry Gas, Percent Wt. of Charge | 7.5 | 4.1 | 13.1 | 8.6 | 8.8 | 10.7 | 8.9 |
| Coke, Percent Wt | 5.0 | 3.3 | 12.9 | 2.7 | 9.8 | 3.2 | 1.6 |
| Total C₄'s, Percent Vol | 9.5 | 4.2 | 8.1 | 3.4 | 8.0 | 8.7 | 5.9 |
| Total C₅'s, Percent Vol | 2.5 | 1.4 | 3.8 | 1.1 | 2.8 | 3.4 | 1.9 |
| C₆ + Gasoline, Percent Vol | 67.0 | 68.5 | 58.3 | 54.8 | 69.1 | 70.8 | 68.6 |
| Products Properties Gasoline: | | | | | | | |
| O.N. Research, Clear | 59.1 | 77.1 | | 68.5 | | 77.8 | 74.2 |
| O.N. Research, +3 cc. TEL | 81.0 | 89.8 | 86.6 | 82.6 | 86.4 | 88.9 | 87.4 |
| Yields: | | | | | | | |
| Dry Gas, Percent Wt. of Charge | 7.5 | 4.1 | 13.1 | 8.6 | 8.8 | 10.7 | 8.9 |
| Coke, Percent Wt | 5.0 | 3.3 | 12.9 | 2.7 | 9.8 | 3.2 | 1.6 |
| Excess C₄'s, Percent Vol | 5.8 | −0.7 | 5.3 | −0.7 | 4.3 | 3.7 | 0.2 |
| 10—RVP Gasoline, Percent Vol | 73.2 | 74.7 | 64.9 | 60.0 | 75.6 | 79.2 | 76.2 |
| O.N. Research, Clear | 64.4 | 81.2 | | 72.5 | | 81.2 | 77.8 |
| O.N. Research, +3 cc. TEL | 83.1 | 91.3 | 88.3 | 84.8 | 88.0 | 90.6 | 89.4 |

It is to be noted from the data of the above table that increasing the temperature from 950° F. to 1100° F. increases the yield of gasoline (with respect to over-all conversion) as well as the gasoline octane number. It is accordingly evident that temperature enhances the hydrogen transfer ability of the composited silica-magnesia-activated charcoal catalyst, although advantage of the composite catalyst is realized even at 1000° F.

It will thus be seen that the present invention affords a method for processing a mixture of gas oils and naphthas over a catalytic composite of silica-magnesia gel and activated charcoal at specified elevated temperatures, low pressures and short contact times with a resultant improved yield of higher octane number gasoline.

I claim:

1. A process for catalytically converting to gasoline a mixed hydrocarbon feed of gas oil and naphtha wherein the volume ratio of gas oil to naphtha is between 10:1 and 1:1, which comprises contacting said feed in vapor form for a period of less than about one second and at a temperature between about 1000° F. and about 1200° F. and a pressure in the approximate range of atmospheric to 100 pounds per square inch with a catalytic composite consisting essentially of: (1) silica-magnesia gel containing approximately 15 to 45 percent by weight of magnesia and the remainder, silica and (2) activated charcoal, said silica-magnesia and activated charcoal components being intimately combined in said composite in a weight ratio of between about 1:2 and 2:1, and thereafter separating the gasoline so produced.

2. A process for catalytically converting to gasoline a mixed hydrocarbon feed of gas oil and naphtha wherein the volume ratio of gas oil to naphtha is between 5:1 and 1.5:1, which comprises contacting said feed in vapor phase for a period of less than about 0.3 second and at a temperature between about 1000° F. and about 1200° F., and a pressure in the approximate range of atmospheric to 100 pounds per square inch with a catalytic composite consisting essentially of: (1) silica-magnesia gel containing approximately 15 to 45 percent by weight of magnesia and the remainder, silica and (2) activated charcoal, said silica-magnesia and activated charcoal components being intimately combined in said composite in a weight ratio of between about 1:2 and 2:1, and thereafter separating the gasoline so produced.

3. A process for catalytically converting to gasoline a mixed hydrocarbon feed of gas oil and naphtha wherein the volume ratio of gas oil to naphtha is between 10:1 and 1:1, which comprises contacting said feed in vapor form for a period of less than about one second and at a temperature between about 1000° F. and about 1200° F. and a pressure in the approximate range of atmospheric to 100 pounds per square inch with a catalytic composite consisting essentially of approximately equal weight proportions of: (1) silica-magnesia gel characterized by an activity index determined by the CAT-A method of between about 30 and about 50 and containing approximately 15 to 45 percent by weight of magnesia and the remainder, silica and (2) activated charcoal, and thereafter separating the gasoline so produced.

4. A process for catalytically converting to gasoline a mixed hydrocarbon feed of gas oil and naphtha wherein the volume ratio of gas oil to naphtha is between 5:1 and 1.5:1, which comprises contacting said feed in vapor form for a period of less than about 0.3 second and at a temperature between about 1000° F. and about 1200° F. and a pressure in the approximate range of atmospheric to 100 pounds per square inch with a catalytic composite consisting essentially of approximately equal weight proportions of: (1) silica-magnesia gel characterized by an activity index determined by the CAT-A method of between about 30 and about 50 and containing approximately 15 to 45 percent by weight of magnesia and the remainder, silica and (2) activated charcoal, and thereafter separating the gasoline so produced.

5. A process for catalytically converting to gasoline a mixed hydrocarbon feed of gas oil and naphtha wherein the volume ratio of gas oil to naphtha is between 10:1 and 1:1, which comprises contacting said feed in vapor form for a period of less than about one second and at a temperature between about 1000° F. and about 1200° F. in the presence of approximately 10 to 50 percent by weight of steam and a pressure in the approximate range of atmospheric to 100 pounds per square inch with a catalytic composite consisting essentially of: (1) silica-magnesia gel characterized by an activity index determined by the CAT-A method of between about 30 and about 50 and containing approximately 15 to 45 percent by weight of magnesia and the remainder, silica and (2) activated charcoal, said silica-magnesia and activated charcoal components being intimately combined in said composite in a weight ratio of between about 1:2 and 2:1, and thereafter separating the gasoline so produced.

6. A process for catalytically converting to gasoline a mixed hydrocarbon feed of gas oil and naphtha wherein the volume ratio of gas oil to naphtha is between 5:1 and 1.5:1, which comprises contacting said feed in vapor form for a period of less than about 0.3 second and a temperature between about 1000° F. and 1200° F. in the presence of approximately 10 to 50 percent by weight of steam and a pressure in the approximate range of atmospheric to 100 pounds per square inch with a catalytic composite consisting essentially of approximately equal weight proportions of: (1) silica-magnesia gel characterized by an activity index determined by the CAT-A method of between about 30 and about 50 and containing approximately 15 to 45 percent by weight of magnesia and the remainder, silica and (2) activated charcoal, and thereafter separating the gasoline so produced.

References Cited in the file of this patent

UNITED STATES PATENTS

| | | |
|---|---|---|
| 2,287,940 | McGrew | June 30, 1942 |
| 2,372,165 | Arveson | Mar. 20, 1945 |
| 2,387,083 | Oblad et al. | Oct. 16, 1945 |
| 2,500,197 | Michael et al. | Mar. 14, 1950 |
| 2,592,603 | Sandford et al. | Apr. 15, 1952 |
| 2,739,944 | Kearby | Mar. 27, 1956 |

OTHER REFERENCES

Conversion of Petroleum, by Sachanen, 2nd ed., 1948 page 326, pub. Rheinhold Pub. Corp., N.Y.C., N.Y. (Copy in Div. 31.)